(12) United States Patent
Suga

(10) Patent No.: US 6,967,687 B1
(45) Date of Patent: Nov. 22, 2005

(54) DISPLAY CONTROL APPARATUS AND METHOD

(75) Inventor: Kazumi Suga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/994,447

(22) Filed: Dec. 19, 1997

(30) Foreign Application Priority Data

Dec. 26, 1996 (JP) ..................................... 8-357170

(51) Int. Cl.$^7$ .......................... H04N 7/01; H04N 11/20; H04N 5/08

(52) U.S. Cl. ....................................... 348/441; 348/458

(58) Field of Search ................................ 348/441, 525, 348/526, 529, 531, 575, 576, 443, 448, 449, 348/458, 459; 345/603, 667, 670, 671, 428, 345/606, 718; H04N 7/01, 11/20, 5/08; G06T 17/10

(56) References Cited

U.S. PATENT DOCUMENTS

| 4,670,773 | A | * | 6/1987 | Silverberg ............... 348/427.1 |
| 5,103,306 | A | * | 4/1992 | Welman et al. .......... 348/400.1 |
| 5,754,710 | A | * | 5/1998 | Sekine et al. ............... 348/451 |
| 5,874,937 | A | * | 2/1999 | Kesatoshi .................... 345/428 |

* cited by examiner

*Primary Examiner*—Vivek Srivatava
(74) *Attorney, Agent, or Firm*—Fitzpatrick, Cella, Harper & Scinto

(57) ABSTRACT

A display control apparatus and a display control method are provided in which a resolution of an input image signal is judged, a change in the image signal is detected, and the image signal is adaptatively interpolated in accordance with the judgement and detection results. A resolution of an input image signal is judged, either a first display mode or a second display mode is selected for the display of the image signal, and the image signal is adaptatively interpolated in accordance with the judgement and selection results. Alternatively, either a computer input signal or a television input signal is input, a resolution of the input signal is judged, and the input signal is adaptatively interpolated in accordance with the selected input and judgement results.

25 Claims, 14 Drawing Sheets

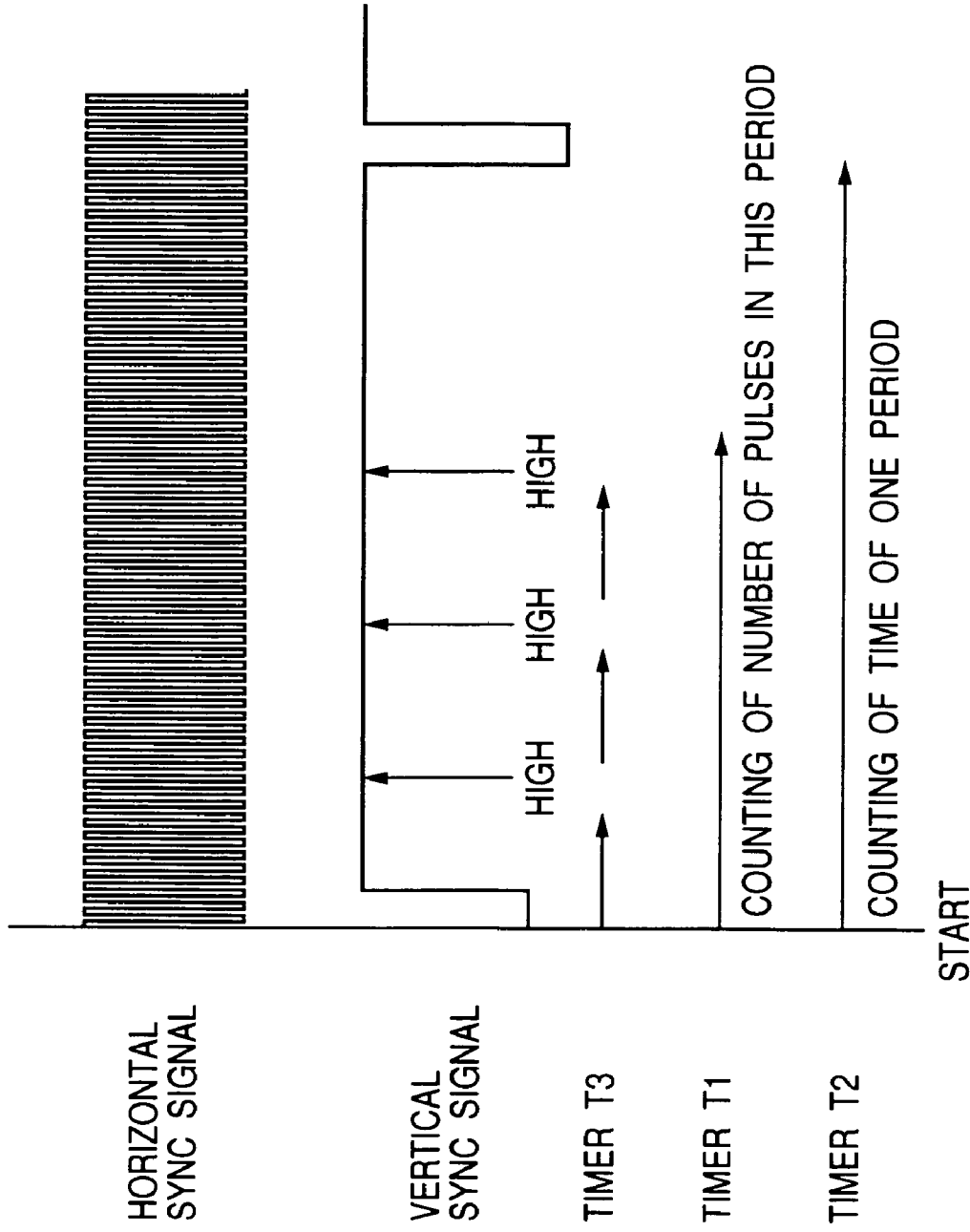

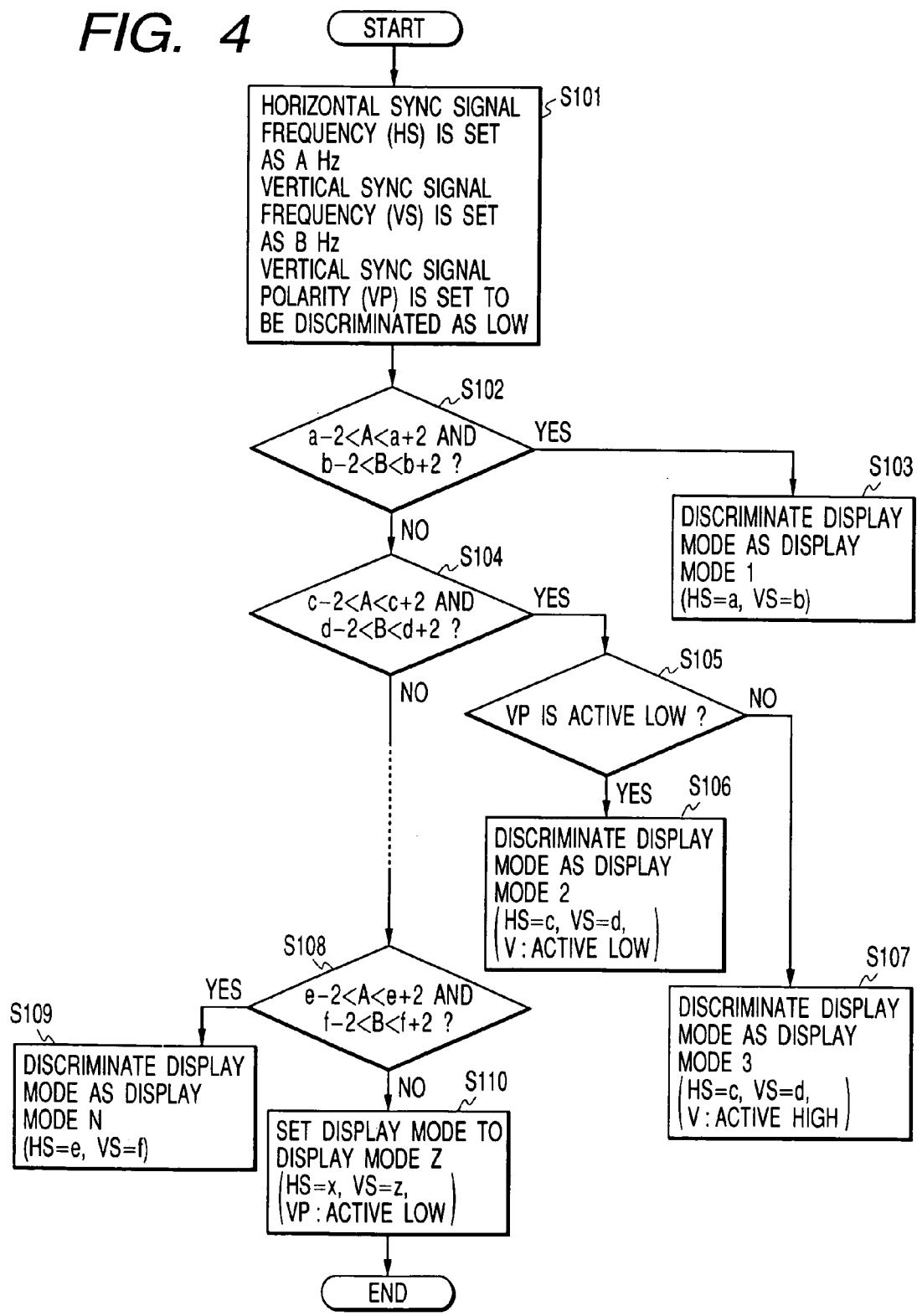

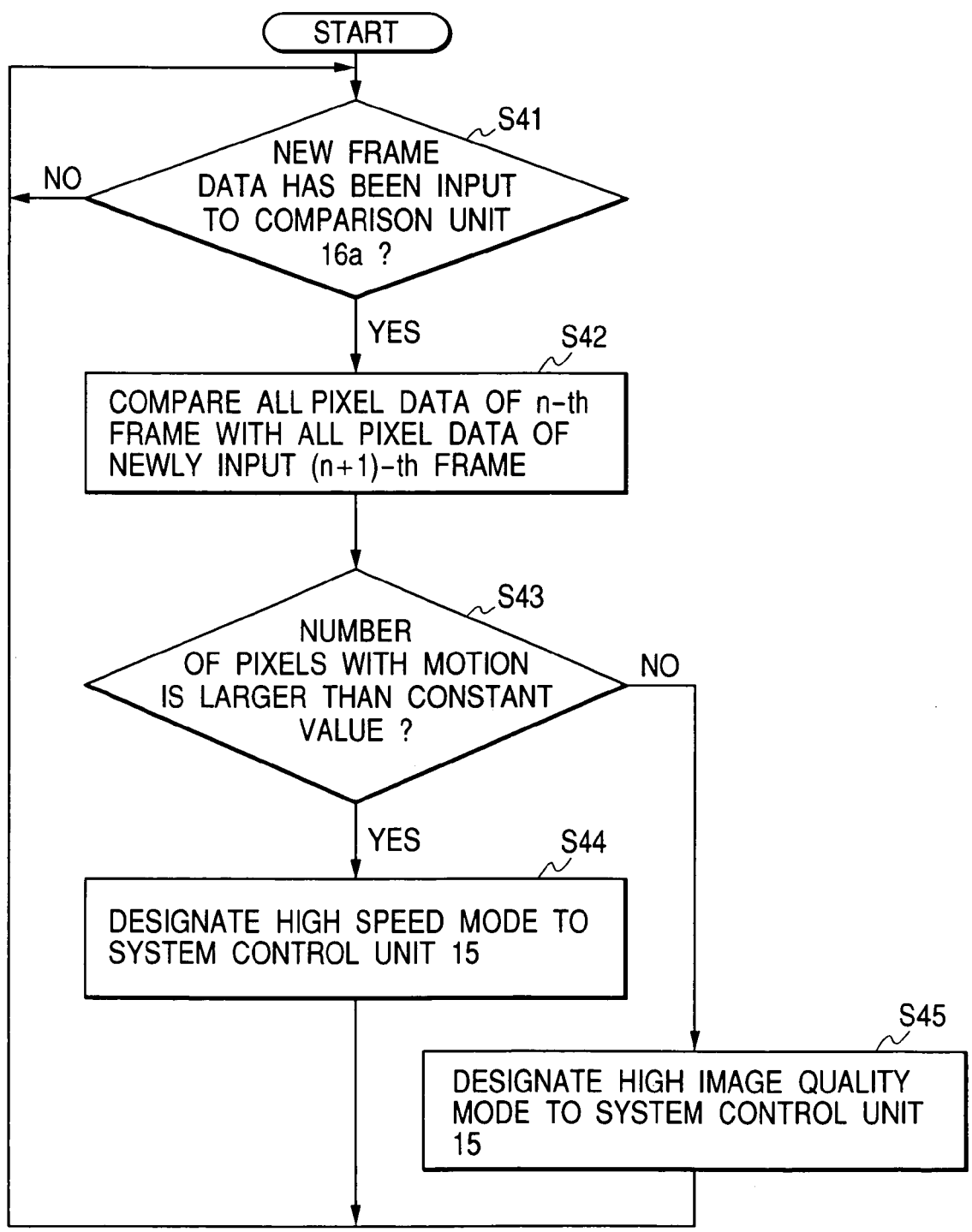

FIG. 8A

IN HIGH SPEED MODE

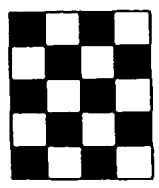
INPUT DATA

⇨ ONLY HORIZONTAL DIRECTION IS INTERPOLATED TO HORIZONTAL RESOLUTION OF DISPLAY DEVICE

⇨ TWO LINES ARE SIMULTANEOUSLY DRIVEN TO DISPLAY SAME DATA

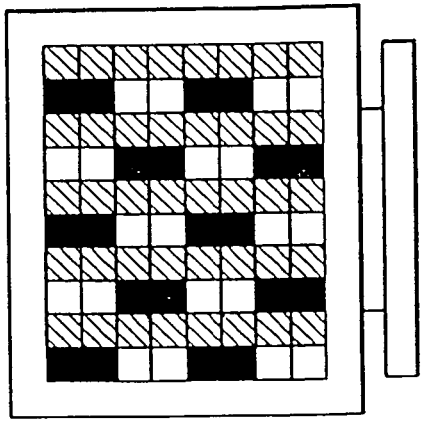

FIG. 8B

IN HIGH IMAGE QUALITY MODE

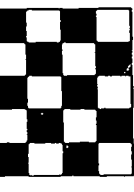
INPUT DATA

⇨ HORIZONTAL AND VERTICAL RESOLUTIONS ARE INTERPOLATED TO THOSE OF DISPLAY DEVICE

⇨ DATA HAVING RESOLUTION EQUAL TO THAT OF DISPLAY DEVICE IS DRIVEN TO BE DISPLAYED

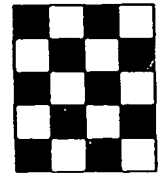

DISPLAY CONTROL APPARATUS AND METHOD

BACKGROUND OF THE INVENTION

1. Field of the Invention

The present invention relates to a display control apparatus and a display control method of controlling the display of a display device such as a dot matrix display device. More particularly, the invention relates to a display control apparatus and a display control method capable of displaying an input signal on a display device even if the input signal has a different resolution from that of the display device.

2. Related Background Art

Raster scan type CRT display devices are widely used with host computers such as personal computers and work stations. Flat panel display devices such as liquid crystal panel display devices and plasma display devices have recently drawn much attention from the viewpoint of space reduction, energy savings and ergonomics (methodology of configuring a system to suit human characteristics by studying optimum working environments).

Between a host computer and a CRT display device, a so-called video signal or analog video data, vertical and horizontal sync signals are transferred or an aggregation thereof (composite signal) is transferred. There are many specifications which define video signals, and some apparatuses, particularly personal computers provide a plurality of resolutions.

For example, some IBM compatible personal computers (PCs) can provide resolutions of 320×200 dots, 640×400 dots, 720×400 dots, 640×350 dots, 640×480 dots, 800×600 dots, 1024×768 dots, 1280×1024 dots and the like.

On the side of CRT display devices, there are so-called multi-sync CRT display devices which measure sync signals of the video signal and determine drive periods of a scan line and its swing width to match the measured sync signals.

Some CRT display devices store in advance measured video signals or sync signals of several types of host computers in a memory as display parameters. If a CRT display device can identify a host computer when the sync signals are measured, it uses the display parameters stored in the memory so that a more precise display of such as a display position can be produced.

The above-conventional display devices are, however, associated with the following problems. Dot matrix display devices such as liquid crystal display devices and plasma display devices adopt a display control method suitable for digital signals. Therefore, after an input analog image signal is A/D converted, it is displayed. In this case, generally, one pixel of a video signal is sampled and displayed in correspondence with one pixel of a display panel, because of the current technical standards of dot matrix display devices.

If a video signal with a low resolution is to be displayed on a dot matrix display device having a high resolution, it becomes necessary to perform a video signal expansion process through interpolation. In addition to this problem, another problem is that a real time display of an image with plentiful motions on a display device having a low refresh rate is impossible unless the image data has a resolution lower than the vertical resolution of the display device.

SUMMARY OF THE INVENTION

Under the above-described background, it is therefore an object of the present invention to provide a display control apparatus and a display control method capable of a real time display of an image with plentiful motions even on a dot matrix display device having a low refresh rate and capable of displaying even a computer signal having display modes at various resolutions or a TV signal on a dot matrix display device having a fixed resolution.

In order to achieve the above object of the invention, in a display control apparatus and a display control method according to a preferred embodiment, a resolution of an input image signal is judged, a change in the image signal is detected, and the image signal is adaptatively interpolated in accordance with the judgement and detection results.

In a display control apparatus and a display control method according to another preferred embodiment, a resolution of an input image signal is judged, either a first display mode or a second display mode is selected for the display of the image signal, and the image signal is adaptatively interpolated in accordance with the judgement and selection results.

In a display control apparatus and a display control method according to still another preferred embodiment, either a computer input signal or a television input signal is input, a resolution of the input signal is judged, and the input signal is adaptatively interpolated in accordance with the selected input and judgement results.

Other objects, features and advantages of the invention will become apparent from the following detailed description taken in conjunction with the accompanying drawings.

BRIEF DESCRIPTION OF THE DRAWINGS

FIG. 3 is a timing chart illustrating the operation of measuring the frequencies of horizontal and vertical sync signals of an input signal according to the first embodiment of the invention.

FIG. 4 is a flow chart illustrating the operation of detecting a display mode according to the first embodiment of the invention.

FIG. 6 is a flow chart illustrating the operation of a motion detection process according to the first embodiment of the invention.

FIGS. 7A and 7B illustrate examples of an interpolation process according to the first embodiment of the invention, wherein FIG. 7A illustrates a linear interpolation method and FIG. 7B illustrates a cubic convolution interpolation method.

FIGS. 8A and 8B illustrate an interpolation process and a drive display process in each of a high speed mode and in a high image quality mode, wherein FIG. 8A illustrates the interpolation process and the drive display process in the high speed mode, and FIG. 8B illustrates the interpolation process and the drive display process in the high image quality mode.

FIGS. 10A, 10B and 10C illustrate examples of an OSD according to the second embodiment, wherein FIG. 10A illustrates an example when a high speed mode is selected, FIG. 10B illustrates an example when a high image quality mode is selected, and FIG. 10C is a schematic diagram of a key panel.

DETAILED DESCRIPTION OF THE PREFERRED EMBODIMENTS

Figure 1:
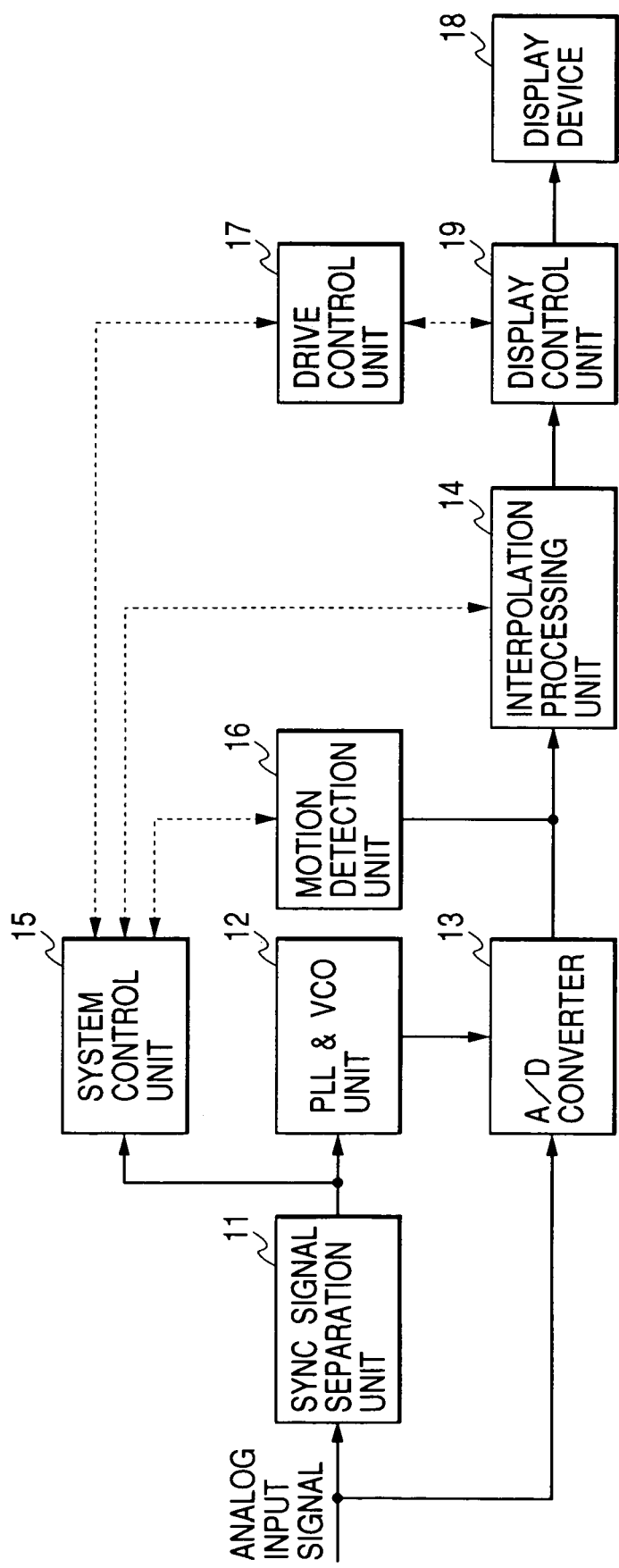
FIG. 1 is a block diagram showing the structure of a display control apparatus according to a first embodiment of the present invention.

First, the structure of a display control apparatus of the first embodiment will be described with reference to FIG. 1. The display control apparatus is constituted of a sync signal separation unit 11, a PLL (phase locked loop) & VCO (voltage controlled oscillator) unit 12, an A/D (analog/digital) converter 13, an interpolation processing unit 14, a system control unit 15, a motion detection unit 16, a drive control unit 17 and a display control unit 19. The display control apparatus performs a display control of a display device 18 and is connected to a host computer (not shown) or the like.

The structure of each component of the display control apparatus will be described in detail. The sync signal separation unit 11 receives a video signal from a host computer or the like, the video signal being constituted of an RGB image signal and sync signals such as a composite sync signal, a separate sync signal and a sync-on green signal. The input video signal is separated into an image signal and a sync signal. Generated from the separated sync signal are horizontal and vertical sync signals of a negative polarity and a sync signal polarity discriminating signal. These horizontal and vertical sync signals and sync signal polarity discriminating signal are supplied to the system control unit 15 and PLL & VCO unit 12 to be later detailed. The image signal is supplied to the A/D converter 13 to be later detailed.

The PLL & VCO unit 12 receives the horizontal and vertical sync signals and sync signal polarity discriminating signal, and generates A/D sampling clocks which are supplied to the A/D converter 13. In response to the sampling clocks, the A/D converter 13 A/D converts the analog input signal into a digital signal and supplies the digital signal to the interpolation processing unit 14 to be later detailed.

The system control unit 15 receives the horizontal and vertical sync signals and measures the frequencies of the input horizontal and vertical sync signals and the vertical sync signal polarity to thereby judge a display mode of the input signal. The system control unit 15 has a horizontal sync signal pulse number count timer T1, a vertical sync signal frequency count timer T2 and a vertical sync signal polarity discriminating timer T3 which will be later described. The measurements by the system control unit 15 of the frequencies of the horizontal and vertical sync signals and the vertical sync signal polarity will be later described.

Figure 5:
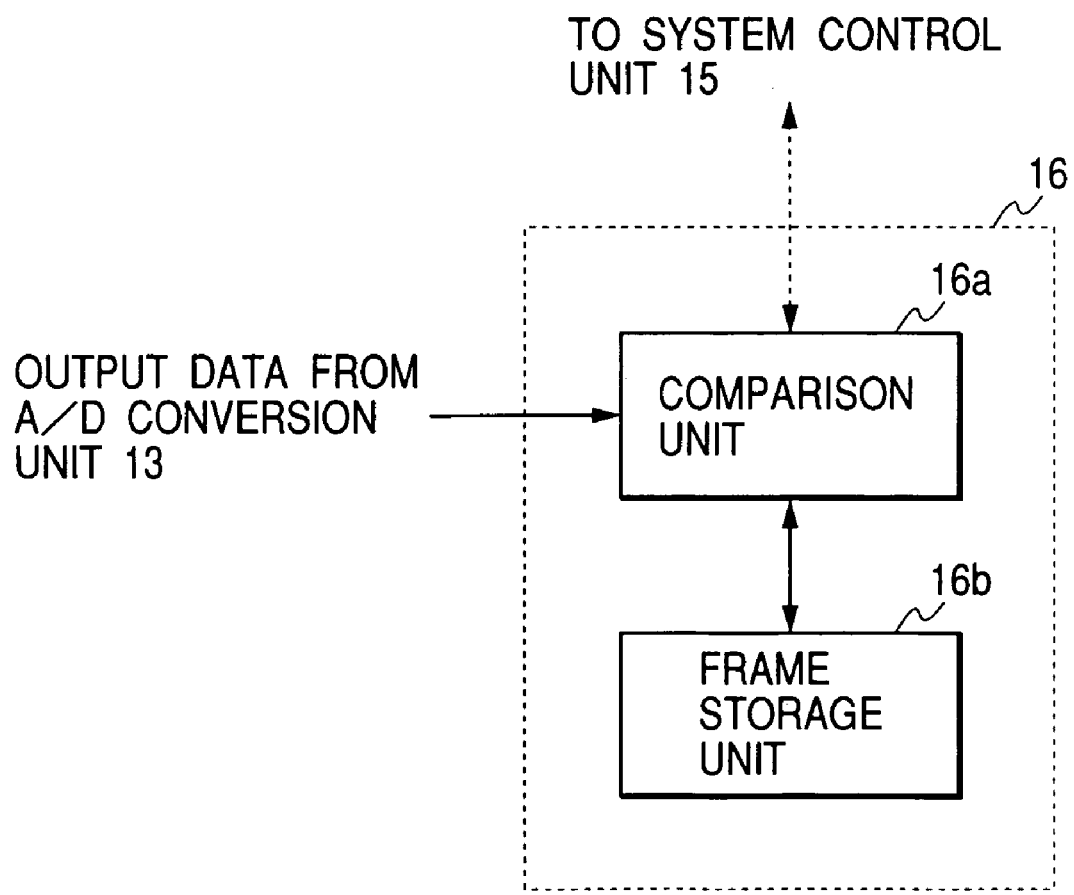
FIG. 5 is a block diagram showing the structure of a motion detection unit according to the first embodiment of the invention.

The motion detection unit 16 has, as shown in FIG. 5, a comparison unit 16a and a frame storage unit 16b. The motion detection unit 16 receives the digital image signal output from the A/D converter 13 and judges whether the image has plentiful motions or not. The judgement result information is transferred to the system control unit 15. The motion detection by the motion detection unit 16 will be later detailed.

The interpolation processing unit 14 interpolates an RGB image signal digitalized by the A/D converter 13, in accordance with a high image quality mode or a high speed mode to be later detailed. In the high image quality mode, the interpolation process is performed to have the same image size as that corresponding to the horizontal and vertical resolutions of the display device 18. In contrast, in the high speed mode, the interpolation process is performed to have the image size corresponding only to the horizontal resolution of the display device 18. A magnification factor by the interpolation process is determined by the system control unit 15 in accordance with the already known resolutions of the display device 18 and with the horizontal and vertical resolutions of the input signal obtained through the display mode judgement by the system control unit 15. The details of the interpolation process by the interpolation unit 14 will be later given.

Under the control of the system control unit 15, the drive control unit 17 instructs the display control unit 19 to perform a predetermined process. The operation of the drive control unit 17 will be later detailed. In accordance with an instruction from the drive control unit 17, the display control unit 19 operates to display the same data on two lines of the display device 18, or display the data having the same resolutions as the horizontal and vertical resolutions, on the display device 18. The display control by the display control unit 19 will be later detailed.

Next, the measurements by the system control unit 15 of the frequencies of the horizontal and vertical sync signals and the vertical sync signal polarity will be described with reference to the flow charts of FIGS. 2A and 2B and the timing chart of FIG. 3.

First, the system control unit 15 causes to start at the same time the counting operations of the horizontal sync signal pulse number count timer T1, vertical sync signal frequency count timer T2 and vertical sync signal polarity discriminating timer T3, to initially start counting the number of horizontal sync signal pulses (Step S81). It is judged (Steps S82 and S83) whether the vertical sync signal pulse is high level or low level during each time duration (one count period by the vertical sync signal polarity discriminating timer T3) longer than the active period of the vertical sync signal and sufficiently shorter than one cycle period. This operation is repeated, for example, three times (Step S84). For example, if a high level is detected two or three times, the polarity of the vertical sync signal is judged as active low (Step S85). FIG. 3 is the timing chart illustrating the relationship between the horizontal and vertical sync signals and timers T1, T2 and T3.

The frequency of the horizontal sync signal is calculated from the number of horizontal sync signal pulses generated until the count of the horizontal sync signal pulse number count timer is completed after the polarity of the vertical sync signal is judged (Steps S86 and S87). For example, if there are 500 pulses while 10 ms is counted, the frequency of the horizontal sync signal is 50 KHz. Next, the frequency of the vertical sync signal is calculated by measuring the time of one cycle period of the horizontal sync signal with the vertical sync signal frequency count timer T2 (Steps S88 and S89). For example, if the vertical sync signal frequency count timer T2 counts 20 ms, the frequency of the vertical sync signal is 50 Hz.

In accordance with the frequencies of the horizontal and vertical sync signals and the polarity of the vertical sync signal obtained in the manner described above, the system control unit 15 judges the display mode (horizontal and vertical resolutions) of the input signal. The display mode judgement will be described with reference to the flow chart of FIG. 4.

Figure 2:
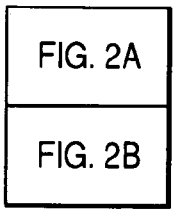
FIG. 2 is comprised of FIGS. 2A and 2B showing flow charts illustrating the operation of measuring the frequencies of horizontal and vertical sync signals of an input signal according to the first embodiment of the invention.
Figure 2A:
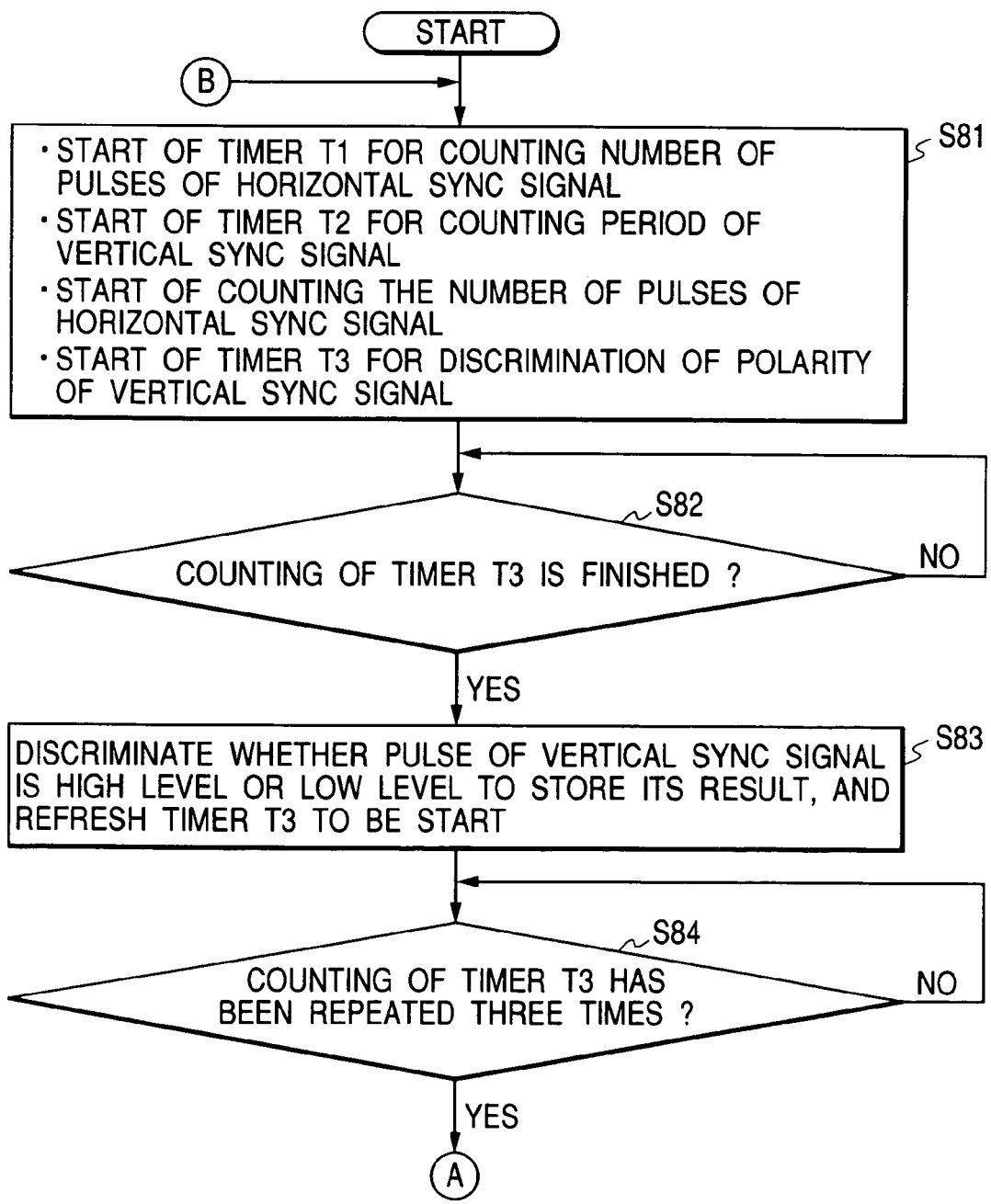
Figure 2B:
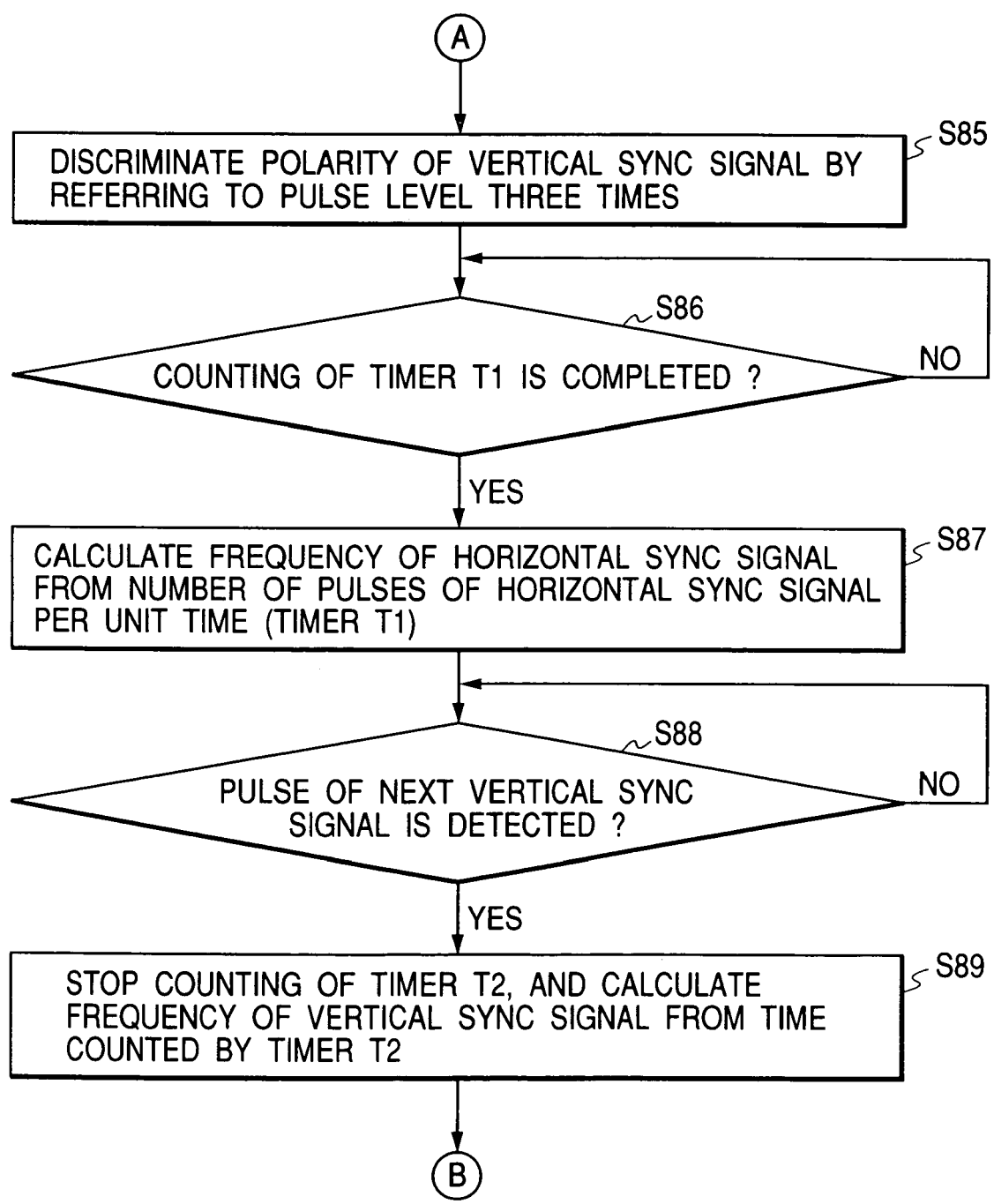

The measurement results by the operation illustrated in FIGS. 2A and 2B are assumed that the horizontal sync signal frequency (hereinafter represented by HS) is A Hz, that the vertical sync signal frequency (hereinafter represented by VS) is B Hz, and that the vertical sync signal polarity (hereinafter represented by VP) is active low (Step S101). Next, it is judged (Step S102) whether the conditions of a−2<A<a+2 and b−2<B<b+2 are satisfied. If the judgement at Step S102 is affirmative, i.e., if HS and VS are near HS and VS of a first display mode (e.g., both HS and VS are in the range from −2 to +2), then it is judged that the display mode is the first display mode (HS=a, VS=b) (Step S103).

If the judgement at Step S102 is negated, it is judged (Step S104) whether the conditions, e.g., c−2<A<c+2 and d−2<B<d+2 are satisfied. If the judgement at Step S104 is affirmative, it is judged (Step S105) whether VP is active low. If the judgement at Step S105 is affirmative, it is judged (Step S106) that the display mode is a second display mode (HS=c, VS=d, VP=active low). If the judgement at Step S105 is negated, it is judged (Step S107) that the display mode is a third display mode (HS=c, VS=d, VP=active high).

If the judgement at Step S104 is negated, it is judged (Step S108), for example, whether the conditions e−2<A<e+2 and f−2<B<f+2 are satisfied. If the judgement at Step S108 is affirmative, it is judged (Step S109) that the display mode is a display mode N (HS=e, VS=f).

The display modes include the modes having the same values of HS and VS and different values of VP, the judgement process for these display modes being indicated at Steps S102 to S107.

If the judgement at Step S108 is negated, i.e., no display mode is judged, the display mode is set (Step S110) to a predetermined display mode Z (HS=x, VS= z, VP=active low).

The motion detection by the motion detection unit 16 of the display control apparatus will be detailed with reference to the block diagram of FIG. 5 and the flow chart of FIG. 6.

The motion detection unit 16 judges whether image data of a new frame is input from the A/D converter 13 to the comparison unit (Step S41). If the new frame data is input, the comparison unit 16a compares each pixel of the new frame data with a corresponding pixel of the frame data one frame before that stored in the frame storage unit 16b, and if a difference between pixel data is larger than a predetermined threshold value, it is judged that this pixel has a motion (Step S42).

It is further judged whether the number of pixels having a motion is equal to or larger than a predetermined value (Step S43). If the number of moving pixels is equal to or larger than the predetermined value, data instructing a high speed mode to be later described is supplied to the system control unit 15 (Step S44). If the number of moving pixels is smaller than the predetermined value, data instructing a high image quality mode to be later described is supplied to the system control unit 15 (Step S45).

Next, the interpolation process by the interpolation processing unit 14 of the display control apparatus will be described with reference to FIGS. 7A and 7B.

As an interpolation processing method generally used, there are a linear interpolation method (first order interpolation method), a cubic convolution interpolation method, and the like. These methods do not retain original data and can perform smooth interpolation, although blur is likely to be generated as a whole.

The cubic convolution interpolation method will be first described with reference to FIG. 7B. With the cubic convolution interpolation method, pixel data to be interpolated is obtained by using a cubic convolution function and the pixel data of two pixels on both sides of an interpolated pixel. The cubic convolution function f is given by the following equation (1) where t is a distance between an interpolated pixel (b2) and a train of four pixels (a0, a1, a2 and a3) disposed at a space 1 on both sides of the interpolated pixel.

$$f(t)=\sin(\pi t)/(\pi t) \qquad (1)$$

The equation (1) is developed into the following equations (2) to (4) depending upon the range of t.

$$f(t)=1-2*|t|^2+|t|^3 \quad (0\leq|t|<1) \qquad (2)$$

$$f(t)=4-8*|t|+5*|t|^2-|t|^3 \quad (1\leq|t|<2) \qquad (3)$$

$$f(t)=0 \qquad (4)$$

Figure 7A:
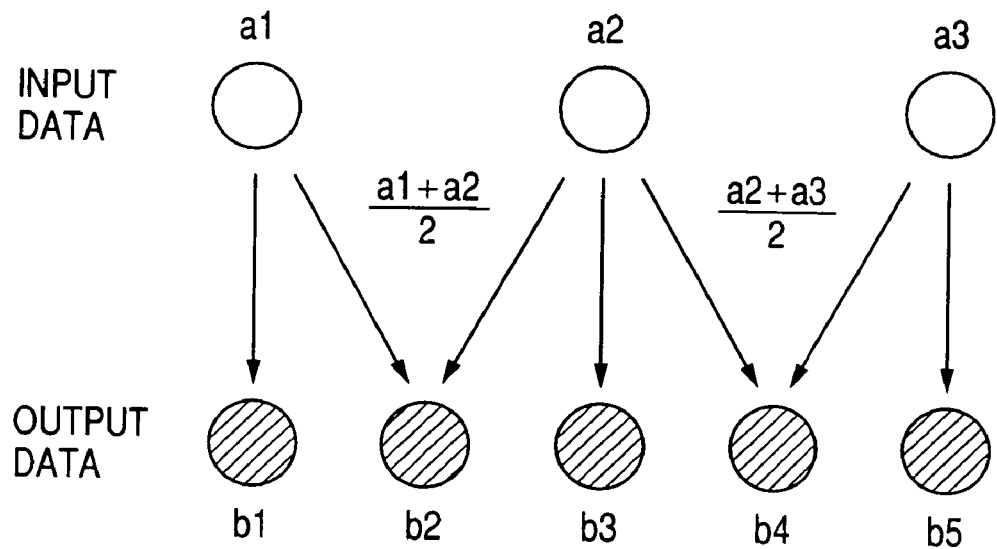
Figure 7B:
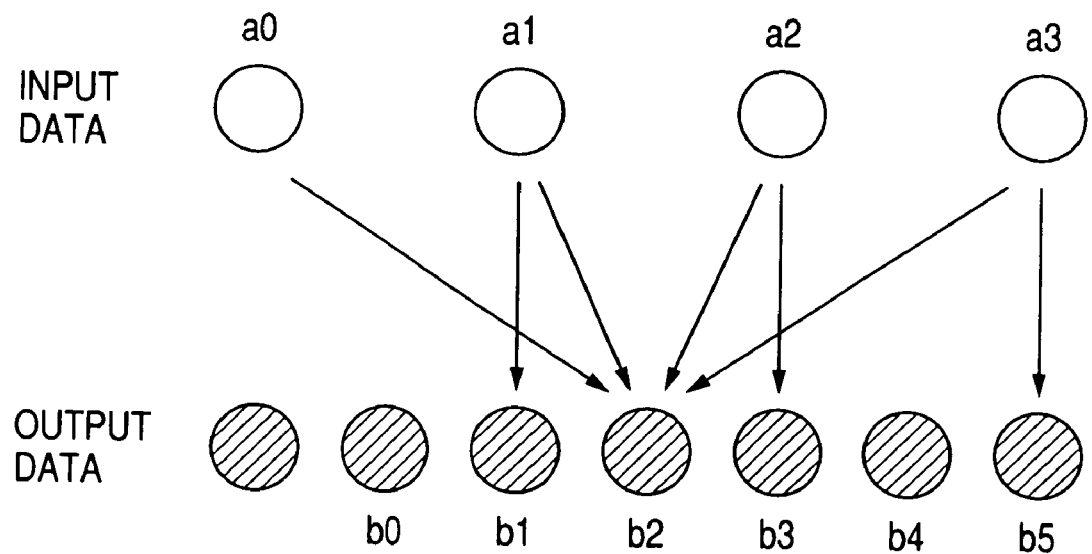

For example, as shown in FIG. 7B, the pixel data of the pixel b2 interpolated at the position (between pixels a1 and a2) spaced from the pixels a0, a1, a2 and a3 disposed at the space 1 by distances u1, u2, u3 and u4 is given by the following equation (5) by using the cubic convolution function f.

$$b2=a0*(4-8*u1+5*u1^2-u1^3)+a1*(1-2*u2^2+u2^3)+a2*(1-2*u3^2+u3^3)+a3*(4-8*u4+5*u4^2-u4^3) \qquad (5)$$

The cubic convolution interpolation method using the equations (1) and (5) will be described by taking as an example an interpolation from four pixels to five pixels. In this example, pixel data of four pixels before interpolation is used for generating five interpolated pixel data. The pixel data bn after the liner interpolation and the pixel data bn after the cubic convolution interpolation are given by the following equations (6) by using the pixel data before interpolation.

$$b5n+1=a4n+1 (n=0,1,2,\ldots)$$

$$b5n+2=(-4/125)*a4n+(29/125)*a4n+1+(116/125)*a4n+2+(-16/125)*a4n+3$$

$$b5n+3=(-12/125)*a4n+1+(62/125)*a4n+2+(93/125)*a4n+3+(-18/125)*a4(n+1)$$

$$b5n+4=(-18/125)*a4n+2+(93/125)*a4n+3+(62/125)*a4(n+1)+(-12/125)*a4(n+1)+1$$

$$b5(n+1)=(-16/125)*a4n+3+(116/125)*a4(n+1)+(29/125)*a4(n+1)+1+(-4/125)*a4(n+1)+2 \qquad (6)$$

With reference to FIG. 7A, a method of partially performing the linear interpolation will be described, which method retains the original data and does not require complicated calculations like the above-described cubic convolution interpolation method. In the example shown in FIG. 7A, two pixels are interpolated by using pixel data of each original pixel.

Input data a1, a2 and a3 are retained as output data b1, b3 and b5, respectively. Output data b2 interpolated between the output data b1 and b3 is obtained as an average of the input data a1 and a2 on both sides of the output data b2. This method retains a fairly large amount of original data. Therefore, although this method performs only a simple process, blur of an image hardly occurs as opposed to the case of a perfect linear interpolation. Moreover, since the linear interpolation is performed also for the smooth half tone image portion, smoothness of the image cannot be degraded.

Next, with reference to FIGS. 8A and 8B, the operations of displaying an image on the display device 18 by the drive control unit 17 and display control unit 19 of the display control apparatus will be described for the high speed mode and for the high image quality mode designated by the motion detection unit 16.

In the high speed mode, under the control of the system control unit 15, the interpolation processing unit 14 performs an interpolation process only in the horizontal direction to make the horizontal resolution of the input signal match with the horizontal resolution of the display device 18. The display control unit 19 drives the display device 18 to display the same data on two lines at the same time (refer to FIG. 8A). Drive and display of the same data on two lines at the same time are performed only if the vertical resolution of the input data is ½ or smaller than that of the display device 18 when it is displayed in the display mode judged by the system control unit. If not, an input signal is displayed one line after another as in the ordinary display control. If the vertical resolution of the input data is ⅓ or smaller than that of the display device 18, the same data is displayed on three lines at the same time. Similarly, if the vertical resolution of the input data is ¼ or smaller than that of the display device 18, the same data is displayed on four lines at the same time.

In the high image quality mode, under the control of the system control unit 15, the interpolation processing unit 14 performs an interpolation process for matching both the horizontal and vertical resolutions of an input signal with those of the display device 18, while taking the judged display mode into consideration. The display control unit 19 drives the display device 18 to display an image having the resolutions same as the horizontal and vertical resolutions of the display device 18 (refer to FIG. 8B).

As described above, the display control apparatus of the first embodiment comprises: the sync signal separation unit 11 for separating an input analog signal of a computer or the like into an image signal and a sync signal and generating horizontal and vertical sync signals and a sync signal polarity signal; the A/D converter 13 for converting the input analog signal into a digital image signal; the system control unit 15 for measuring the frequencies of the input horizontal and vertical sync signals and judging the display mode in accordance with the measured results; the motion detection unit 16 for judging whether the digital image signal output from the A/D converter 13 is an image having plentiful motions; the interpolation processing unit 14 for performing an interpolation process of changing the resolution only in the horizontal direction to the same horizontal resolution of the display device 18 if the motion detection unit 16 judges that the image has plentiful motions, and performing an interpolation process of changing the resolutions both in the horizontal and vertical directions to the same horizontal and vertical resolutions of the display device 18 if the motion detection unit 16 judges that the image has not plentiful motions; and the drive control unit 17 for controlling to display the same data on N lines of the display device 18 at the same time where N is a quotient of the vertical resolution of the display device 18 divided by the vertical resolution of the input signal, if the motion detection unit 16 judges that the image has plentiful motions, and to display the image one line after another if the motion detection unit 16 judges that the image has not plentiful motions. Accordingly, even a dot matrix display device having a low refresh rate can display in real mode an image with plentiful motions, and even a computer signal having various display modes with different resolutions and a TV signal can be displayed on a dot matrix display device with a fixed resolution.

In the second embodiment, the high speed mode and the high image quality mode are manually switched by an operator instead of automatic switching therebetween by the motion detection unit 16 of the first embodiment.

Figure 9:
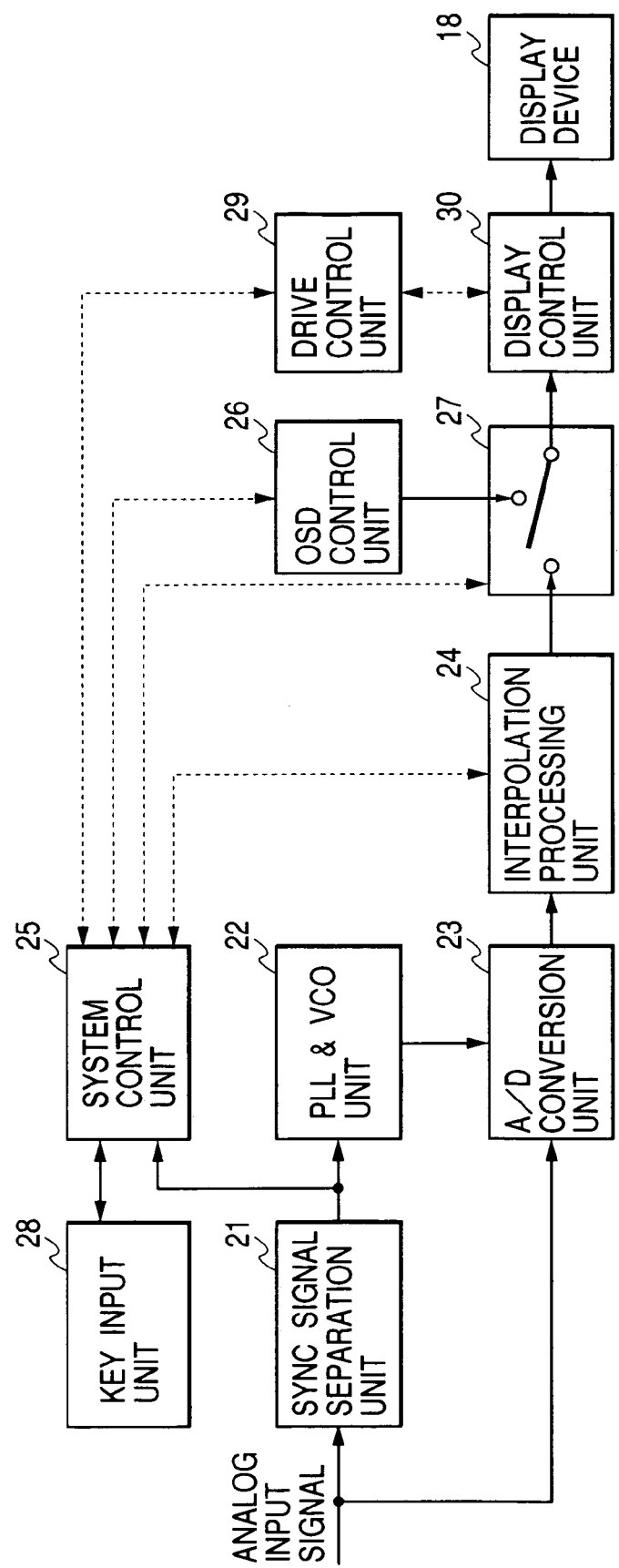
FIG. 9 is a block diagram showing the structure of a display control apparatus according to a second embodiment of the present invention.

The structure of a display control apparatus of the second embodiment will be described with reference to FIG. 9. The display control apparatus is constituted of a sync signal separation unit 21, a PLL (phase locked loop) & VCO (voltage controlled oscillator) unit 22, an A/D (analog/digital) converter 23, an interpolation processing unit 24, a system control unit 25, an on-screen display (OSD) control unit 26, a switch 27, a key input unit 28, a drive control unit 29 and a display control unit 30. The display control apparatus performs a display control of a display device 18 and is connected to a host computer (not shown) or the like.

The structure of each component of the display control apparatus will be described in detail. The sync signal separation unit 21 receives a video signal from a host computer or the like, the video signal being constituted of an RGB image signal and sync signals such as a composite sync signal, a separate sync signal and a sync-on green signal. The input video signal is separated into an image signal and a sync signal. Generated from the separated sync signal are horizontal and vertical sync signals of a negative polarity and a sync signal polarity discriminating signal. These horizontal and vertical sync signals and sync signal polarity discriminating signal are supplied to the system control unit 25 and PLL & VCO unit 22 to be later detailed. The image signal is supplied to the A/D converter 23 to be later detailed.

The PLL & VCO unit 22 receives the horizontal and vertical sync signals and sync signal polarity discriminating signal, and generates A/D sampling clocks which are supplied to the A/D converter 23. In response to the sampling clocks, the A/D converter 23 A/D converts the analog input signal into a digital signal and supplies the digital signal to the interpolation processing unit 24 to be later detailed.

The system control unit 25 receives the horizontal and vertical sync signals and measures the frequencies of the input horizontal and vertical sync signals and the vertical sync signal polarity to thereby judge a display mode of the input signal. The measurements by the system control unit 25 of the frequencies of the horizontal and vertical sync signals and the vertical sync signal polarity are the same as detailed in the first embodiment, and so the description thereof is omitted.

In accordance with the frequencies of the horizontal and vertical sync signals and the polarity of the vertical sync signal obtained as described previously, the system control unit 25 judges the display mode (horizontal and vertical resolutions) of the input signal. The display mode judgement by the system control unit 25 has been detailed in the first embodiment, and so the description thereof is omitted.

The OSD control unit 26 is controlled by the system control unit 25 and has a function of facilitating the display mode switching by an operator via the key input unit 28. The display mode switching by an operator via the key input unit 28 and output data from the OSD control unit 26 will be described with reference to FIGS. 10A to 10C.

Figure 10A:
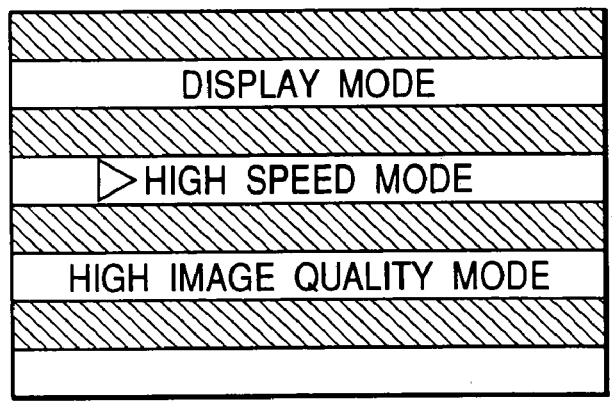
Figure 10B:
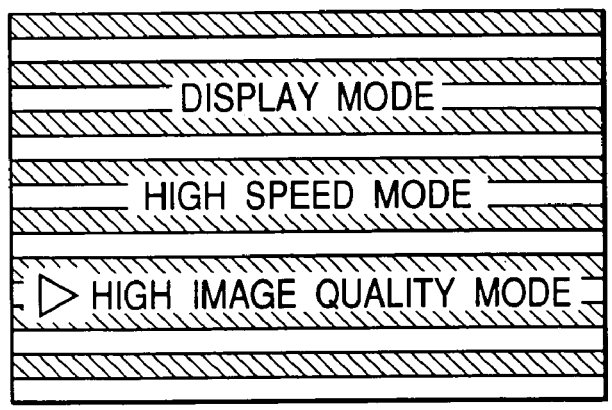

As an operator depresses a MENU button of the key input unit 28 shown in FIG. 10C, OSD data such as shown in FIG. 10A or 10B is sent from the OS control unit 26 to the display device 18 via the switch 27 to be later detailed. The operator operates upon a SELECT button shown in FIG. 10C to switch the display mode between the high speed mode and the high image quality mode. Each time the SELECT switch is operated upon, the OSD display is switched between the displays of FIGS. 10A and 10B.

The switch 27 selects either image data output from the interpolation processing unit 24 to be later detailed or OSD data output from the OSD control unit 26, and supplies the selected data to the display control unit 30 to be later detailed. The display control unit 30 synthesizes the image data and OSD data to form one image.

The interpolation processing unit 24 interpolates an RGB image signal digitalized by the A/D converter 23, in accordance with a high image quality mode or a high speed mode to be later detailed. In the high image quality mode, the interpolation process is performed to have the same image size as that corresponding to the horizontal and vertical resolutions of the display device 18. In contrast, in the high speed mode, the interpolation process is performed to have the image size corresponding only to the horizontal resolution of the display device 18. A magnification factor by the interpolation process is determined by the system control unit 25 in accordance with the already known resolutions of the display device 18 and with the horizontal and vertical resolutions of the input signal obtained through the display mode judgement by the system control unit 25.

Under the control of the system control unit 25, the drive control unit 29 instructs the display control unit 30 to perform a predetermined process. In accordance with an instruction from the drive control unit 29, the display control unit 30 operates to display the same data on two lines of the display device 18, or display the data having the same resolutions as the horizontal and vertical resolutions, on the display device 18. The operations by the drive control unit 29 and the display control unit 30 has been detailed in the first embodiment, and so the description thereof is omitted.

As described above, the display control apparatus of the second embodiment comprises: the sync signal separation unit 21 for separating an input analog signal of a computer or the like into an image signal and a sync signal and generating horizontal and vertical sync signals and a sync signal polarity signal; the A/D converter 23 for converting the input analog signal into a digital image signal; the system control unit 25 for measuring the frequencies of the input horizontal and vertical sync signals and judging the display mode in accordance with the measured results; the key input unit 28 for selecting either the high speed mode or the high image quality mode; the OSD control unit 26 for outputting as display data the display mode switching state selected by the key input unit 28 to the display device 18; the interpolation processing unit 24 for performing an interpolation process of changing the resolution only in the horizontal direction to the same horizontal resolution of the display device 18 if the high speed mode is selected by the key input unit 28, and performing an interpolation process of changing the resolutions both in the horizontal and vertical directions to the same horizontal and vertical resolutions of the display device 18 if the high image quality mode is selected; the switch 27 for selecting either the image data output from the interpolation processing unit 24 or the display data output from the OSD control unit 26; and the drive control unit 29 for controlling to display the same data on N lines of the display device 18 at the same time where N is a quotient of the vertical resolution of the display device 18 divided by the vertical resolution of the input signal, if the key input unit 28 selects the high speed mode, and to display the image one line after another if the high image quality mode is selected. Accordingly, even a dot matrix display device having a low refresh rate can display in real mode an image with plentiful motions, and even a computer signal having various display modes with different resolutions and a TV signal can be displayed on a dot matrix display device with a fixed resolution. Further, switching between the high speed mode and the high image quality mode can be manually performed in response to a key input by an operator.

In the first and second embodiments, only a single analog signal from a computer is used. In the third embodiment, two analog input signals from a computer and a TV are processed. However, in the third embodiment, switching between the high speed mode and the high image quality mode is automatically performed by using the motion detection unit same as the first embodiment, both when the computer input signal is displayed and when the TV input signal is displayed.

Figure 11:
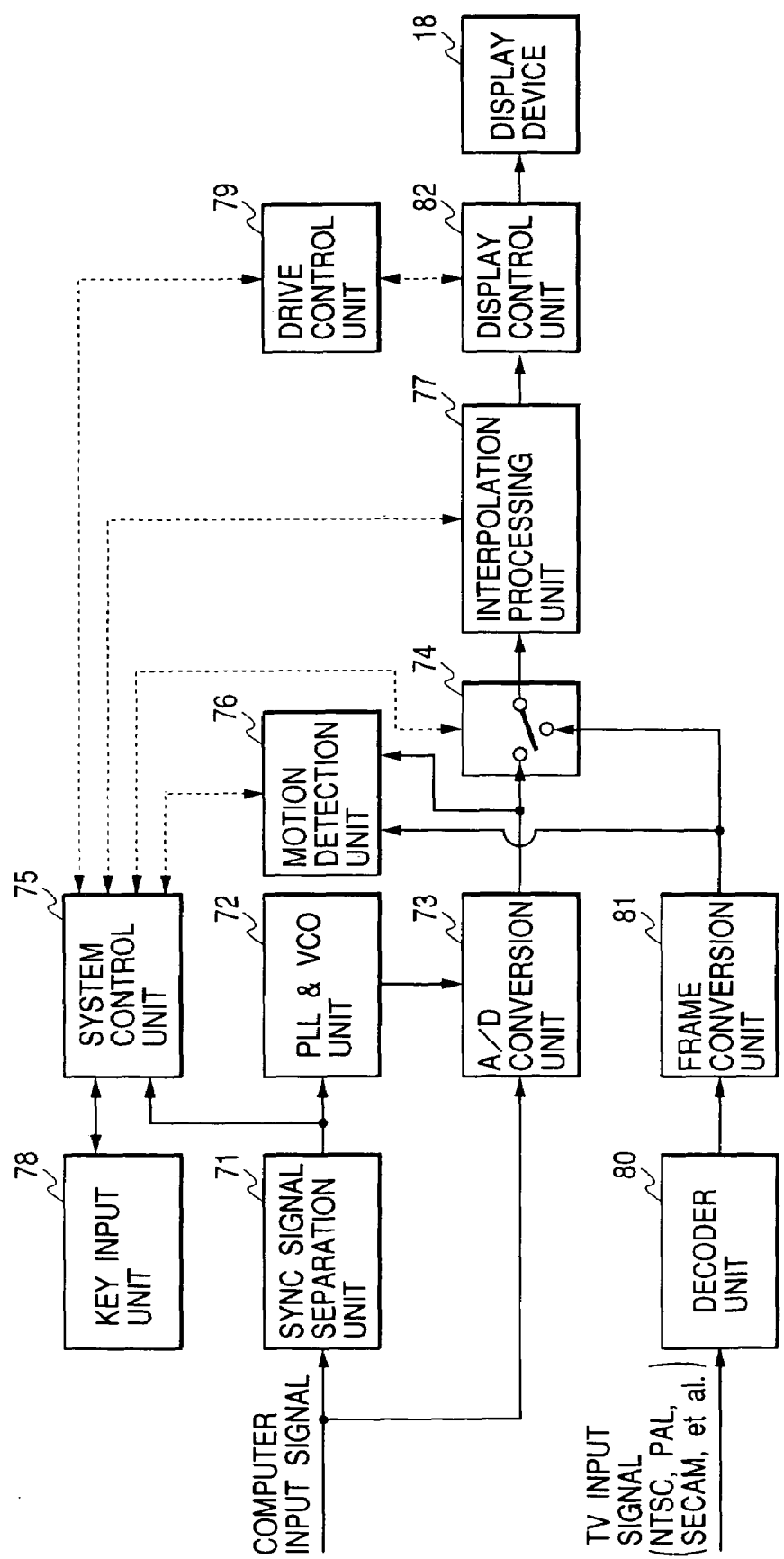
FIG. 11 is a block diagram showing the structure of a display control apparatus according to a third embodiment of the present invention.

The structure of a display control apparatus of the third embodiment will be described with reference to FIG. 11. The display control apparatus is constituted of a sync signal separation unit 71, a PLL (phase locked loop) & VCO (voltage controlled oscillator) unit 72, an A/D (analog/digital) converter 73, a switch 74, a system control unit 75, a motion detection unit 76, an interpolation processing unit 77, a key input unit 78, a drive control unit 79, a decoder unit 80, a frame conversion unit 81 and a display control unit 82. The display control apparatus performs a display control of a display device 18 and is connected to a host computer (not shown) or the like.

The structure of each component of the display control apparatus will be described in detail. The sync signal separation unit 71 receives a video signal from a host computer or the like, the video signal being constituted of an RGB image signal and sync signals such as a composite sync signal, a separate sync signal and a sync-on green signal. The input video signal is separated into an image signal and a sync signal. Generated from the separated sync signal are horizontal and vertical sync signals of a negative polarity and a sync signal polarity discriminating signal. These horizontal and vertical sync signals and sync signal polarity discriminating signal are supplied to the system control unit 75 and PLL & VCO unit 72 to be later detailed. The image signal is supplied to the A/D converter 73 to be later detailed.

The PLL & VCO unit 72 receives the horizontal and vertical sync signals and sync signal polarity discriminating signal, and generates A/D sampling clocks which are supplied to the A/D converter 73. In response to the sampling clocks, the A/D converter 73 A/D converts the analog input signal into a digital signal and supplies the digital signal to the interpolation processing unit 77 to be later detailed.

The system control unit 75 receives the horizontal and vertical sync signals and measures the frequencies of the input horizontal and vertical sync signals and the vertical sync signal polarity to thereby judge a display mode of the input signal. The measurements by the system control unit 75 of the frequencies of the horizontal and vertical sync signals and the vertical sync signal polarity are the same as detailed in the first embodiment, and so the description thereof is omitted.

In accordance with the frequencies of the horizontal and vertical sync signals and the polarity of the vertical sync signal obtained as described previously, the system control unit 75 judges the display mode (horizontal and vertical resolutions) of the input signal. The display mode judgement by the system control unit 75 has been detailed in the first embodiment, and so the description thereof is omitted. In this case, however, if a TV signal is selected from the computer signal input and the TV signal input by an operator via the key input unit 78 to be later detailed, the image data is processed as having horizontal and vertical resolutions of 640×480.

Figure 12:
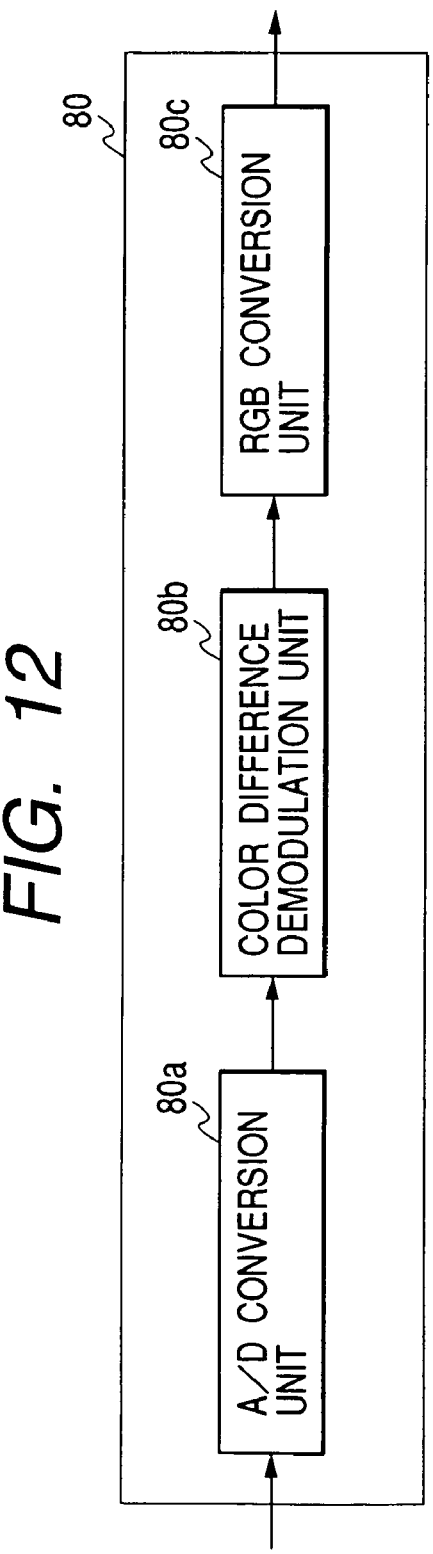
FIG. 12 is a block diagram showing the structure of a decoder unit according to the third embodiment of the invention.

The decoder unit 80 has, as shown in FIG. 12, an A/D conversion unit 80a, a color difference demodulation unit 80b and an RGB conversion unit 80c. The decoder unit 80 receives a TV signal of NTSC (national television system committee) or the like which is A/D converted by the A/D conversion unit 80a, demodulated into color difference signals by the color difference demodulation unit 80b, and matrix-converted from YCrCb signals into RGB signals by the RGB conversion unit 80c to generate digital image data (field data) of 640×240 pixels at the frequency of 60 Hz same as the input signal.

Figure 13:
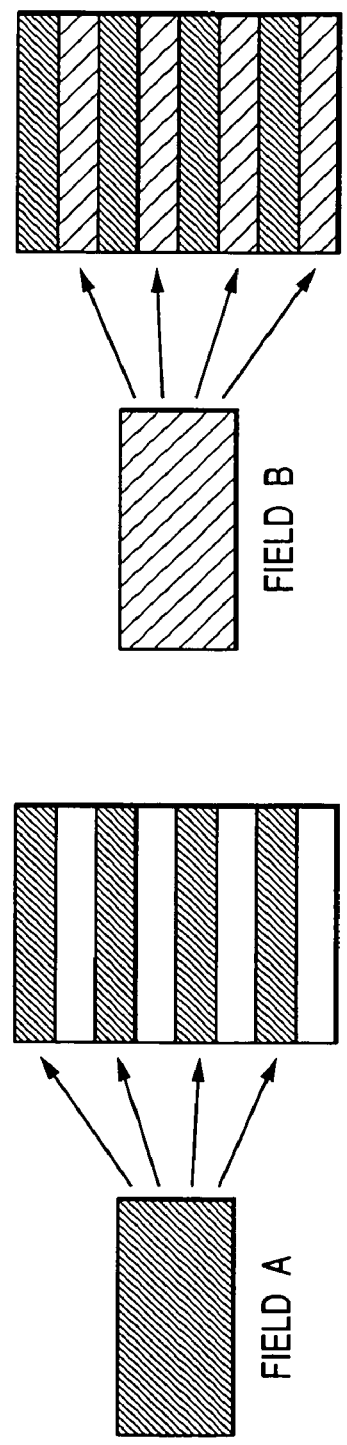
FIG. 13 illustrates frame conversion according to the third embodiment of the invention.

The frame conversion unit 81 alternately combines lines of the field images having the frequency of 60 Hz and converts the field images into frame images having the frequency of 30 Hz, as illustrated in FIG. 13. As a result, the image having the horizontal and vertical resolutions of 640×480 can be supplied to the switch 74 to be later detailed.

Figure 10C:
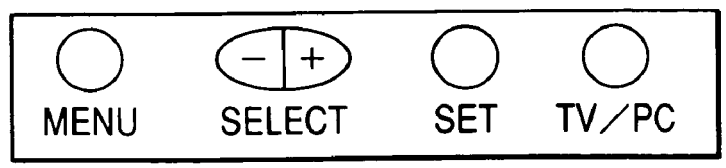

The key input unit 78 has a function of switching between the computer signal input and the TV signal input upon depression by an operator of a TV/PC button on a key panel of the key input unit 78 such as shown in FIG. 10C. The switching between the computer signal input and the TV signal input can be effected by the system control unit 75 which controls the switch 74 in accordance with switching information supplied from the key input unit 78.

The motion detection unit 76 receives the computer image signal output from the A/D converter 73 and the TV image signal output from the frame conversion unit 81 and judges whether each image has plentiful motions or not. The judgement result information is transferred to the system control unit 75. The motion detection by the motion detection unit 76 has been detailed in the first embodiment, and so the description thereof is omitted.

The interpolation processing unit 77 interpolates the computer image signal or TV image signal output from the switch 74, in accordance with the high image quality mode or high speed mode. In the high image quality mode, the interpolation process is performed to have the same image size as that corresponding to the horizontal and vertical resolutions of the display device 18. In contrast, in the high speed mode, the interpolation process is performed to have the image size corresponding only to the horizontal resolution of the display device 18. A magnification factor by the interpolation process is determined by the system control unit 75 in accordance with the already known resolutions of the display device 18 and with the horizontal and vertical resolutions of the input signal obtained through the display mode judgement by the system control unit 75.

Under the control of the system control unit 75, the drive control unit 79 instructs the display control unit 82 to perform a predetermined process. In accordance with an instruction from the drive control unit 79, the display control unit 82 operates to display the same data on two lines of the display device 18, or display the data having the same resolutions as the horizontal and vertical resolutions, on the display device 18. The display control by the drive control unit 79 and display control unit 82 has been detailed in the first embodiment, and so the description thereof is omitted.

As described above, the display control apparatus of the third embodiment comprises: the sync signal separation unit 71 for separating an input analog signal of a computer or the like into an image signal and a sync signal and generating horizontal and vertical sync signals and a sync signal polarity signal; the A/D converter 73 for converting the input analog signal into a digital image signal; the system control unit 75 for measuring the frequencies of the input horizontal and vertical sync signals and judging the display mode in accordance with the measured results; the frame conversion unit 81 for converting RGB data of the TV input signal from the field unit into the frame unit; the motion detection unit 76 for judging whether the digital image signal output from the A/D converter 73 or the RGB data output from the frame conversion unit 81 is an image having plentiful motions; the key input unit 78 for selecting either the TV signal input or the computer signal input; the switch 74 for selecting either the TV signal input or the computer signal input in accordance with a selection by the key input unit 78; the interpolation processing unit 77 for performing an interpolation process of changing the resolution only in the horizontal direction to the same horizontal resolution of the display device 18 if the motion detection unit 76 judges that the image has plentiful motions, and performing an interpolation process of changing the resolutions both in the horizontal and vertical directions to the same horizontal and vertical resolutions of the display device 18 if the motion detection unit 76 judges that the image has not plentiful motions; and the drive control unit 79 for controlling to display the same data on N lines of the display device 18 at the same time where N is a quotient of the vertical resolution of the display device 18 divided by the vertical resolution of the input signal, if the motion detection unit 76 judges that the image has plentiful motions, and to display the image one line after another if the motion detection unit 76 judges that the image has not plentiful motions. Accordingly, even a dot matrix display device having a low refresh rate can display in real mode an image with plentiful motions, and even a computer signal having various display modes with different resolutions and a TV signal can be displayed on a dot matrix display device with a fixed resolution. Further, two input signals not only a computer input signal but also a TV input signal can be processed.

In the first and second embodiments, only one analog signal supplied from a computer is used. In the fourth embodiment, two analog signals supplied from a computer and a TV are processed similar to the third embodiment. However, switching between the high speed mode and the high image quality mode is automatically performed to set the high image quality mode when the computer input signal is displayed and the high speed mode when the TV input signal is displayed, as different from the third embodiment.

Figure 14:
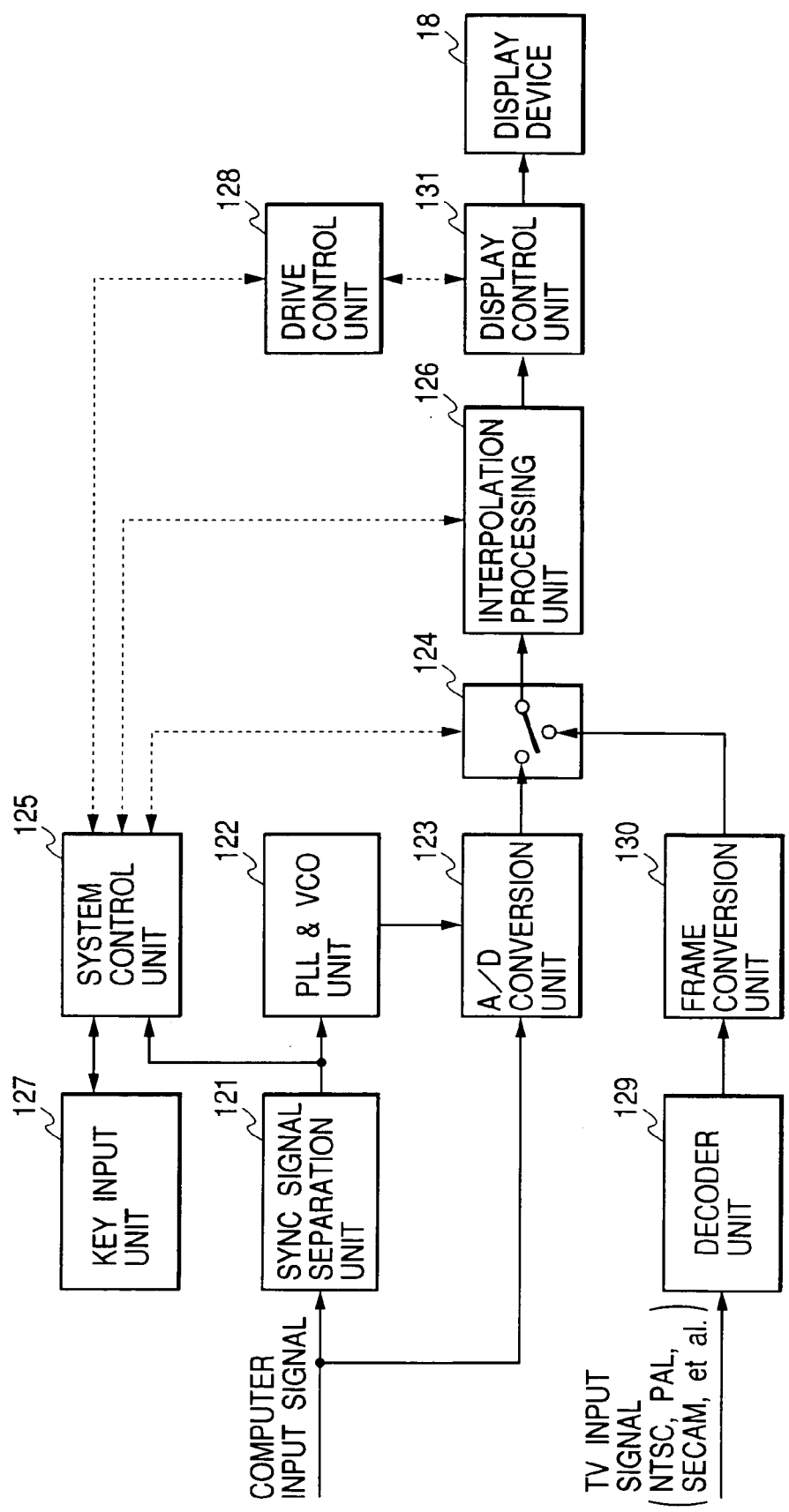
FIG. 14 is a block diagram showing the structure of a display control apparatus according to a fourth embodiment of the present invention.

The structure of a display control apparatus of the fourth embodiment will be described with reference to FIG. 14. The display control apparatus is constituted of a sync signal separation unit 121, a PLL (phase locked loop) & VCO (voltage controlled oscillator) unit 122, an A/D (analog/digital) converter 123, a switch 124, a system control unit 125, an interpolation processing unit 126, a key input unit 127, a drive control unit 128, a decoder unit 129, a frame conversion unit 130 and a display control unit 131. The display control apparatus performs a display control of a display device 18 and is connected to a host computer (not shown) or the like.

The structure of each component of the display control apparatus will be described in detail. The sync signal separation unit 121 receives a video signal from a host computer or the like, the video signal being constituted of an RGB image signal and sync signals such as a composite sync signal, a separate sync signal and a sync-on green signal. The input video signal is separated into an image signal and a sync signal. Generated from the separated sync signal are horizontal and vertical sync signals of a negative polarity and a sync signal polarity discriminating signal. These horizontal and vertical sync signals and sync signal polarity discriminating signal are supplied to the system control unit 125 and PLL & VCO unit 122 to be later detailed. The image signal is supplied to the A/D converter 123 to be later detailed.

The PLL & VCO unit 122 receives the horizontal and vertical sync signals and sync signal polarity discriminating signal, and generates A/D sampling clocks which are supplied to the A/D converter 123. In response to the sampling clocks, the A/D converter 123 A/D converts the analog input signal into a digital signal and supplies the digital signal to the switch 124 to be later detailed.

The system control unit 125 receives the horizontal and vertical sync signals and measures the frequencies of the input horizontal and vertical sync signals and the vertical sync signal polarity to thereby judge a display mode of the input signal. The measurements by the system control unit 125 of the frequencies of the horizontal and vertical sync signals and the vertical sync signal polarity are the same as detailed in the first embodiment, and so the description thereof is omitted.

In accordance with the frequencies of the horizontal and vertical sync signals and the polarity of the vertical sync signal obtained as described previously, the system control unit 125 judges the display mode (horizontal and vertical resolutions) of the input signal. The display mode judgement by the system control unit 125 has been detailed in the first embodiment, and so the description thereof is omitted. In this case, however, if a TV signal is selected from the computer signal input and the TV signal input by an operator via the key input unit 127 to be later detailed, the image data is processed as having horizontal and vertical resolutions of 640×480.

Similar to the third embodiment, the decoder unit 129 receives a TV signal of NTSC (national television system committee) or the like which is A/D converted by an A/D conversion unit of the decoder unit 129, demodulated into color difference signals by a color difference demodulation unit of the decoder unit 129, and matrix-converted from YCrCb signals into RGB signals by an RGB conversion unit of the decoder unit 129 to generate digital image data (field data) of 640×240 pixels at the frequency of 60 Hz same as the input signal.

The frame conversion unit 130 alternately combines lines of the field images having the frequency of 60 Hz and converts the field images into frame images having the frequency of 30 Hz. As a result, the image having the horizontal and vertical resolutions of 640×480 can be supplied to the switch 124 to be later detailed.

Similar to the third embodiment, the key input unit 127 has a function of switching between the computer signal input and the TV signal input upon depression by an operator of a TV/PC button on a key panel of the key input unit 127 such as shown in FIG. 10C. The switching between the computer signal input and the TV signal input can be effected by the system control unit 125 which controls the switch 124 in accordance with switching information supplied from the key input unit 127.

If a signal output from the switch 124 is the computer image signal, the interpolation processing unit 126 performs an interpolation process to make the computer image signal have the same image size as that corresponding to the horizontal and vertical resolutions of the display device 18. In contrast, if the switch 124 outputs the TV image signal, the interpolation process is performed to have the image size corresponding only to the horizontal resolution of the display device 18. A magnification factor by the interpolation process is determined by the system control unit 125 in accordance with the already known resolutions of the display device 18 and with the horizontal and vertical resolutions of the input signal obtained through the display mode judgement by the system control unit 125.

Under the control of the system control unit 125, the drive control unit 128 instructs the display control unit 131 to perform a predetermined process. In accordance with an instruction from the drive control unit 128, the display control unit 131 operates to display the same data on two lines of the display device 18 simultaneously, or display the data having the same resolutions as the horizontal and vertical resolutions, on the display device 18.

The display control by the drive control unit 128 and display control unit 131 will be detailed. If an operator selects the TV image signal, the interpolation processing unit 126 performs, under the control of the system control unit 125, an interpolation process to make the TV image have the image size corresponding only to the horizontal resolution of the display device 18. In this case, the display control unit 131 displays the same data on two lines of the display device 18 at the same time. If the vertical resolution of the display device is a threefold or more of 480, the same data is displayed on three lines at the same time. Similarly, if the vertical resolution of the display device is a fourfold or more of 480, the same data is displayed on four lines at the same time.

In contrast, if an operator selects the computer image signal, the interpolation processing unit 126 performs, under the control of the system control unit 125, an interpolation process to make the computer image signal have the same image size as that corresponding to the horizontal and vertical resolutions of the display device 18. In this case, the display control unit 131 displays the data having the same resolutions as the horizontal and vertical resolutions of the display device 18.

As described above, the display control apparatus of the fourth embodiment comprises: the sync signal separation unit 121 for separating an input analog signal of a computer or the like into an image signal and a sync signal and generating horizontal and vertical sync signals and a sync signal polarity signal; the A/D converter 123 for converting the input analog signal into a digital image signal; the system control unit 125 for measuring the frequencies of the input horizontal and vertical sync signals and judging the display mode in accordance with the measured results; the frame conversion unit 130 for converting RGB data of the TV input signal from the field unit into the frame unit; the key input unit 127 for selecting either the TV signal input or the computer signal input, the switch 124 for selectively outputting either the TV input signal or the computer input signal in accordance with the selection by the key input unit 127; the interpolation processing unit 126 for performing an interpolation process of changing the resolution only in the horizontal direction to the same horizontal resolution of the display device 18 if the key input unit 127 selects the TV signal input, and performing an interpolation process of changing the resolutions both in the horizontal and vertical directions to the same horizontal and vertical resolutions of the display device 18 if the computer signal input is selected; and the drive control unit 128 for controlling to display the same data on N lines of the display device 18 at the same time where N is a quotient of the vertical resolution of the display device 18 divided by the vertical resolution of the input signal, if the key input unit 127 selects the TV signal input, and to display the image one line after another if the computer signal input is selected. Accordingly, even a dot matrix display device having a low refresh rate can display in real mode an image with plentiful motions, and even a computer signal having various display modes with different resolutions and a TV signal can be displayed on a dot matrix display device with a fixed resolution. Further, two input signals not only a computer input signal but also a TV input signal can be processed.

The foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A display control apparatus comprising:
   an input unit, arranged to input an image signal;
   a judgement unit, arranged to judge a resolution of the image signal;
   a detection unit, arranged to detect movement between pictures of the image signal;
   an interpolation unit, arranged to adaptatively interpolate the image signal in accordance with the judgement results by said judgement unit and with the detection results by said detection unit; and
   a control unit arranged to switch between a first state of driving a display device so as to input a driving signal through one line by one line among total lines of the display device and a second state of driving the display device so as to input the driving signal through partial and plural lines by partial and plural lines among the total lines of the display device in accordance with the detection results of said detection unit.

2. An apparatus according to claim 1, wherein said input unit can selectively input one of an image signal from a computer and an image signal of a television format.

3. An apparatus according to claim 2, further comprising:
   a conversion unit, arranged to convert the image signal of the television format from a field unit signal into a frame unit signal.

4. An apparatus according to claim 1, wherein said interpolation unit interpolates the image signal to have a horizontal resolution same as the horizontal resolution of a display device, if said detection unit detects that the change in the image signal is large, and in other cases, interpolates the image signal to have horizontal and vertical resolutions same as the horizontal and vertical resolutions of the display device.

5. An apparatus according to claim 4, wherein the resolution of the image signal is smaller than the resolution of the display device.

6. An apparatus according to claim 1, wherein said control unit selects the state of driving the display device so as to input the driving signal through partial and plural lines by partial and plural lines among the total lines of the display device when said detection unit detects the movement between the pictures of the image signals, which is larger than a predetermined value.

7. An apparatus according to claim 1, wherein said judgement unit judges a resolution in accordance with a sync signal contained in the image signal.

8. An apparatus according to claim 7, wherein said judgement unit judges a resolution by measuring horizontal and vertical sync signals contained in the image signal.

9. A display control apparatus comprising:
   an input unit, arranged to input an image signal;
   a judgement unit, arranged to judge a resolution of the image signal;
   a selection unit, arranged to select one of a first image signal interpolation mode and a second image signal interpolation mode whose interpolation method is different from that of the first image signal interpolation mode;
   an interpolation unit, arranged to adaptatively interpolate the image signal in accordance with the judgement results by said judgement unit and with the selection results by said selection unit; and
   a control unit arranged to switch between a first state of driving a display device so as to input a driving signal through one line by one line among total lines of the display device, and a second state of driving the display device so as to input the driving signal through partial and plural lines by partial and plural lines among the total lines of the display device in accordance with the selection results of said selection unit.

10. An apparatus according to claim 9, wherein:
    the first image signal interpolation mode is a mode of interpolating the image signal to have a horizontal resolution same as the horizontal resolution of the display device and displaying the same image signal on a plurality of lines of the display device at the same time; and
    the second image signal interpolation mode is a mode of interpolating the image signal to have horizontal and vertical resolutions same as the horizontal and vertical resolutions of the display device and displaying the image signal on the display device.

11. An apparatus according to claim 9, wherein said judgement unit judges a resolution in accordance with a sync signal contained in the image signal.

12. An apparatus according to claim 11, wherein said judgement unit judges a resolution by measuring horizontal and vertical sync signals contained in the image signal.

13. A display control apparatus comprising:
    an input unit, arranged to selectively input one of a computer image signal generated from a computer and a television image signal of a television format;
    a judgement unit, arranged to judge a resolution of the image signal input by said input unit;
    an interpolation unit, arranged to adaptatively interpolate the image signal input by said input unit in accordance with a kind of image signal input by said input unit and with the judgement results by said judgement unit; and
    a control unit arranged to switch between a first state of driving a display device so as to input a driving signal through one line by one line among total lines of the display device, and a second state of driving the display device so as to input the driving signal through partial and plural lines by partial and plural lines among the total lines of the display device in accordance with the kind of image signal input.

14. An apparatus according to claim 13, wherein said interpolation unit interpolates the television image signal to have a horizontal resolution same as the horizontal resolution of a display device, if said input unit inputs the television image signal, and interpolates the computer image signal to have horizontal and vertical resolutions same as the horizontal and vertical resolutions of the display device if said input unit inputs the computer image signal.

15. An apparatus according to claim 14, wherein said control unit controls the display device so as to drive the plurality of lines thereof at the same time in a common time period if the television image signal is input.

16. An apparatus according to claim 13, wherein said judgement unit judges a resolution in accordance with a sync signal contained in the image signal.

17. An apparatus according to claim 16, wherein said judgement unit judges a resolution by measuring horizontal and vertical sync signals contained in the image signal.

18. An apparatus according to claim 13, further comprising:
a conversion unit, arranged to convert the television image signal from a field unit signal into a frame unit signal.

19. A display control method comprising the steps of:
inputting an image signal;
judging a resolution of the image signal;
detecting a moving change between pictures of the image signal;
adaptatively interpolating the image signal in accordance with the judgement results in said judging step and with the detection results in said detecting step; and
controlling switching between a first state of driving a display device so as to input a driving signal through one line by one line among total lines of the display device, and a second state of driving the display device so as to input the driving signal through partial and plural lines by partial and plural lines among the total lines of the display device in accordance with the detection results in said detecting step.

20. A display control method comprising the steps of:
inputting an image signal;
judging a resolution of the image signal;
selecting one of a first image signal interpolation mode and a second image signal interpolation mode whose interpolation method is different from that of the first image signal interpolation mode;
adaptatively interpolating the image signal in accordance with the judgement results in said judging step and with the selection results in said selecting step; and
controlling switching between a first state of driving a display device so as to input a driving signal through one line by one line among total lines of the display device, and a second state of driving the display device so as to input the driving signal through partial and plural lines by partial and plural lines among the total lines of the display device in accordance with the selection results in said selecting step.

21. A display control method comprising the steps of:
selectively inputting one of a computer image signal generated from a computer and a television image signal of a television format;
judging a resolution of the image signal input in said inputting step;
adaptatively interpolating the image signal input in said inputting step, in accordance with a kind of image signal input in said inputting step and with the judgement results by said judging step; and
controlling switching between a first state of driving a display device so as to input a driving signal through one line by one line among total lines of the display device, and a second state of driving the display device so as to input the driving signal through partial and plural lines by partial and plural lines among the total lines of the display device in accordance with the kind of image signal input said inputting step.

22. A display control apparatus comprising:
an input unit, arranged to input an image signal;
a detection unit, arranged to detect movement between pictures of the image signal; and
a control unit arranged to switch between a first state of driving a display device so as to input a driving signal through one line by one line among total lines of the display device, and a second state of driving the display device so as to input the driving signal through partial and plural lines by partial and plural lines among the total lines of the display device in accordance with the detection results of said detection unit.

23. An apparatus according to claim 22, wherein said input unit can selectively input one of an image signal from a computer and an image signal of a television format.

24. An apparatus according to claim 22, further comprising:
a conversion unit, arranged to convert the image signal of a television format from a field unit signal into a frame unit signal.

25. An apparatus according to claim 22, wherein said control unit selects the state of driving the display device so as to input the driving signal through partial and plural lines by partial and plural lines among the total lines of the display device when said detection unit detects movement between the pictures of the image signals which is larger than a predetermined value.

* * * * *

UNITED STATES PATENT AND TRADEMARK OFFICE
CERTIFICATE OF CORRECTION

PATENT NO. : 6,967,687 B1
APPLICATION NO. : 08/994447
DATED : November 22, 2005
INVENTOR(S) : Kazumi Suga It is certified that error appears in the above-identified patent and that said Letters Patent is hereby corrected as shown below:

COLUMN 6:

Line 36, "liner" should read --linear--.

COLUMN 18:

Line 18, "input" should read --input in--.

Signed and Sealed this

Twenty-ninth Day of August, 2006

JON W. DUDAS
*Director of the United States Patent and Trademark Office*